United States Patent
Kadowaki et al.

(10) Patent No.: US 8,599,043 B2
(45) Date of Patent: Dec. 3, 2013

(54) PARKING ASSIST APPARATUS

(75) Inventors: Jun Kadowaki, Kariya (JP); Kazuya Watanabe, Anjo (JP); Yu Tanaka, Nagoya (JP); Kosuke Sato, Toyota (JP); Atsuo Fukaya, Obu (JP); Hiroyuki Tachibana, Kariya (JP); Motokatsu Tomozawa, Nagoya (JP); Kenji Kodera, Chita-gun (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 288 days.

(21) Appl. No.: 13/202,259

(22) PCT Filed: Feb. 15, 2010

(86) PCT No.: PCT/JP2010/052135
§ 371 (c)(1),
(2), (4) Date: Aug. 18, 2011

(87) PCT Pub. No.: WO2010/098216
PCT Pub. Date: Sep. 2, 2010

(65) Prior Publication Data
US 2011/0298639 A1 Dec. 8, 2011

(30) Foreign Application Priority Data
Feb. 26, 2009 (JP) ................................. 2009-044745

(51) Int. Cl.
*B60Q 1/48* (2006.01)
*G05D 1/00* (2006.01)

(52) U.S. Cl.
USPC ........... 340/932.2; 340/425.5; 701/1; 701/25; 180/199; 180/204

(58) Field of Classification Search
USPC ....................................................... 340/932.2
See application file for complete search history.

(56) References Cited

U.S. PATENT DOCUMENTS

| | | | |
|---|---|---|---|
| 6,611,744 | B1 | 8/2003 | Shimazaki et al. |
| 7,053,794 | B2 | 5/2006 | Tanaka et al. |
| 7,099,758 | B2 | 8/2006 | Tanaka et al. |
| 7,127,339 | B2 | 10/2006 | Iwazaki et al. |
| 7,487,020 | B2 | 2/2009 | Iwazaki et al. |
| 7,640,108 | B2 | 12/2009 | Shimizu et al. |
| 8,085,167 | B2 | 12/2011 | Tanaka et al. |

(Continued)

FOREIGN PATENT DOCUMENTS

| | | |
|---|---|---|
| CN | 1383408 A | 12/2002 |
| EP | 1918173 A1 | 5/2008 |

(Continued)

OTHER PUBLICATIONS

International Search Report of PCT/JP2010/052135, dated Apr. 13, 2010.

(Continued)

*Primary Examiner* — Donnie Crosland
(74) *Attorney, Agent, or Firm* — Sughrue Mion, PLLC (57) ABSTRACT

A parking assist apparatus includes a parking target position setting section for setting a parking target position when a vehicle is to be parked by reversing, a parking pathway determining section for determining possibility/impossibility of direct parking for parking the vehicle to the parking target position without turnaround, and a report outputting section for effecting reporting to allow a driver engaged in parking to recognize the possibility/impossibility of the direct parking based on the result of determination by the parking pathway determining section.

9 Claims, 9 Drawing Sheets

(56) References Cited

U.S. PATENT DOCUMENTS

| | | |
|---|---|---|
| 2002/0104700 A1 | 8/2002 | Shimazaki et al. |
| 2003/0150661 A1 | 8/2003 | Kataoka et al. |
| 2004/0260439 A1 | 12/2004 | Endo et al. |
| 2008/0094252 A1 | 4/2008 | Uhler |
| 2008/0231469 A1 | 9/2008 | Knoll et al. |
| 2009/0303080 A1 | 12/2009 | Kadowaki et al. |
| 2010/0013670 A1 | 1/2010 | Hueppauff et al. |
| 2010/0219010 A1 | 9/2010 | Kadowaki |

FOREIGN PATENT DOCUMENTS

| | | | |
|---|---|---|---|
| GB | 2 434 020 A | | 7/2007 |
| JP | 2002-120742 A | | 4/2002 |
| JP | 2003-045269 A | | 2/2003 |
| JP | 2003-205809 A | | 7/2003 |
| JP | 2003-237511 A | | 8/2003 |
| JP | 2005-239048 A | | 9/2005 |
| JP | 2006-347460 A | | 12/2006 |
| JP | 2007-126028 A | | 5/2007 |
| JP | 2008-083990 A | | 4/2008 |
| JP | 2008-284969 A | | 11/2008 |
| WO | 2005/100135 A1 | | 10/2005 |
| WO | 2007/012516 A1 | | 2/2007 |

OTHER PUBLICATIONS

Extended European Search Report, issued May 31, 2012, in European Patent Application No. 10746097.4.

International Preliminary Report on Patentability issued in PCT/JP2010/052135 dated Sep. 22, 2011.

Chinese Office Action issued in Chinese Application No. 201080009651.7 dated Feb. 27, 2013.

Korean Office Action issued in Korean Application No. 10-2011-7019974 dated Mar. 20, 2013.

U.S. Appl. No. 12/705,809, filed Feb. 15, 2010, Jun Kadowaki.

01 set parking target position
02 determination operation
03 direct parking OR turnaround parking
21 report direct parking information
22 travel by predetermined distance
23 determination operation
24 direct parking OR turnaround parking
25 parking target position reached?
26 instruct vehicle stop

31 report turnabout parking information
32 travel by predetermined distance
33 determination operation
34 direct parking OR turnaround parking
35 turnaround point?
36 report turnaround point and turnaround forwarding by predetermined distance
37 determination operation
38 direct parking OR turnaround parking
39 turnaround forwarding stop position

101 obtain photographic image
102 estimated parking area detection operation
103 estimated parking position detected?
104 calculate parking target position
02 determination operation

Fig. 14

201 obtain photographic information
202 estimated parking area detection operation
203 estimated parking position detected?
204 calculate parking target position
205 direct parking determination operation
206 direct parking possible?
21 report direct parking information
34 direct parking OR turnaround parking
38 direct parking OR turnaround parking

PARKING ASSIST APPARATUS

CROSS REFERENCE TO RELATED APPLICATIONS

This application is a National Stage of International Application No. PCT/JP2010/052135 filed Feb. 15, 2010, claiming priority based on Japanese Patent Application No. 2009-044745 filed Feb. 26, 2009, the contents of all of which are incorporated herein by reference in their entirety.

TECHNICAL FIELD

The present invention relates to a parking assist apparatus, more particularly to a technique of parking assist control in a direct parking operation in which a vehicle is caused to travel in reverse for parking based upon positional relationship between a stopped position of the vehicle and a set parking target position to reach the parking target position and a turnaround parking in which the vehicle is caused to reach the parking target position via at least one reversing and forwarding turnaround.

BACKGROUND ART

As an example of the above-described parking assist apparatus, for guiding a vehicle from its stopped position to a target parking position by causing the vehicle to reverse, Patent Document 1 discloses a direct parking guide in which the vehicle is caused to reach the target parking position directly by one time reversing from a stop position and a turnaround parking in which the vehicle is caused to reach the parking target position via at least one reversing and forwarding turnaround. The turnaround parking is effected in case it is not possible to establish any pathway that allows the vehicle to reach the target parking position directly from the stop position even with selecting the maximum steering angle. Therefore, in the turnaround parking, firstly, there is established a guiding pathway to a preliminary target position in the vicinity of the target parking position and the vehicle is reversed along this guiding pathway to reach and stop at the preliminary target position. Thereafter, there is established a further guiding pathway to a forwarding target position to be reached by turning of the steering wheel, so that the vehicles is forwarded along this guiding pathway and stopped at the forwarding target position. Upon arrival at this forwarding target position, there is provided higher possibility for the vehicle to reach the parking target position directly from the forwarding target position, i.e. higher possibility of direct parking operation. Then, if direct parking operation is possible indeed, the vehicle can be guided directly to the parking target position.

Further, Patent Document 2 relating to the above-described parking assist apparatus discloses a technique according to which a vehicle is stopped at a position where a parking lot can be confirmed and then with an operation of a switch, parking assist is initiated. With this parking assist technique, from image data obtained by a camera, a parking lot delimiting line or the like formed on the road surface is obtained, thereby to detect the parking lot delimiting line and then a parking target position is set. Next, a parking pathway calculating section calculates a temporary parking pathway from a temporary reverse travel starting position to determine whether a parking target position can be reached or not. This calculation is effected in repetition with each forwarding of the vehicle. And, if a valid parking pathway has been established, this is reported by a report outputting section through a speaker. In response to this report, the driver will stop the vehicle and then effect an operation for initiating backing of the vehicle, in order to cause the vehicle to travel in reverse along the parking pathway, a guiding section will guide the vehicle to the parking position by means of automatic steering that controls a power steering unit. In this parking assist technique, the turnaround parking mode is not taken into consideration.

PRIOR ART DOCUMENTS

Patent Document 1: Japanese Unexamined Patent Application Publication No. 2003-237511 (paragraph numbers [0016] to [0053], FIGS. 1-4)

Patent Document 2: Japanese Unexamined Patent Application Publication No. 2008-284969 (paragraph numbers [0023] to [0069], FIGS. 1-19).

SUMMARY OF INVENTION

Object to be Achieved by Invention

As described above, a parking process by reversing (i.e. "reverse parking") can be divided into a direct parking process and a turnaround parking process. In the case of the direct parking process, once a vehicle has started reversing from a stopped condition for parking, the vehicle will continue to reverse until reaching the parking target position. And, the position stopped after this reversing becomes the final parking position. On the other hand, in the case of turnaround parking process, the initial reversing is a reversing until a turnaround position. The vehicle will make a temporary stop at this turnaround position and then forward by a predetermined distance. If a direct parking is found possible at a stop position reached after this forwarding, then, a direct parking process will be effected to complete the parking. Whereas, if the direct parking is found not possible, the vehicle will turn around to effect a parking process again.

As described above, a parking process by reverse parking, i.e. a reverse parking, includes not only a direct parking process in which once the vehicle starts reversing, the vehicle will continue to reverse until it reaches the final parking position, but also a turnaround parking process in which the vehicle has to make a temporary stop in the course of its reversing and then effect forwarding. Therefore, whether the reverse parking process is effected by automatic steering using a control apparatus or effected manually by a driver, it is important that the driver be precisely aware of whether the currently ongoing parking process is a direct parking process or a process in which he/she has to stop the vehicle temporarily in the course of the process.

Therefore, the object of the present invention is to provide a parking assist apparatus capable of making a driver recognize, when a vehicle is being reversed to a target parking position, whether the parking process is a direct parking process or a parking process in the course of which the vehicle needs to be stopped temporarily in the course of the process.

Means for Achieving the Object

For accomplishing the above-noted object, a parking assist apparatus relating to the present invention comprises:

a parking target position setting section for setting a parking target position when a vehicle is to be parked by reversing;

a parking pathway determining section for determining possibility/impossibility of direct parking for parking the vehicle to the parking target position without turnaround; and a report outputting section for effecting reporting to allow a driver engaged in parking to recognize the possibility/impossibility of the direct parking based on the result of determination by the parking pathway determining section.

According to the above construction, the parking pathway determining section determines possibility/impossibility of direct parking for parking the vehicle to the parking target position directly with one reversing operation. Then, based upon the result of determination, the report outputting section outputs a report whether the currently ongoing reversing is a direct parking process or the vehicle needs to be stopped in the middle of the process for turnaround. By this reporting, the driver can recognize whether the currently ongoing reversing is a direct parking process or the vehicle is to be stopped temporarily in the mid of the process. With this, there is realized a smooth and secure-feeling parking operation by reversing.

According to one preferred embodiment of the present invention, the apparatus further comprises a turnaround parking pathway generating section for generating a turnaround parking pathway for parking to the parking target position via turnaround traveling;

wherein said turnaround parking pathway generating section generates turnaround point information for specifying a turnaround point in the turnaround parking and said report outputting section reports a turnaround point based on said turnaround point information.

With the above arrangement, the driver is notified of the turnaround point which is important in the turnaround parking process in which the driver needs to make a temporary stop in the middle of reversing and then effect forwarding. As a result, there is realized a reverse parking with even greater secure feeling. Further, with the generation of the turnaround parking pathway, it becomes possible to make the driver aware precisely of whether the currently ongoing reversing is a direct parking process or is a part of a turnaround parking process, through reporting by the report outputting section. When the vehicle effects reverse parking from the parking start position to the parking target position, different reports will issue between the case when the parking complete position can be reached directly with the currently ongoing reversing and the case when a turnaround is needed and a temporary stop is needed at the turnaround point.

As the mode of outputting from the report outputting section, various modes can be employed. However, in view of the fact that in most parking assist controls, preferably, the monitor displays a vehicle rearward photographic view captured by a rear view camera, the report for the recognition of the possibility/impossibility of the direct parking is effected in the form of image display on the monitor. Similarly, in view of the fact that there is often employed a parking assist system by means of voice or sound (including musical sound, alarm sound, or the like) from a speaker, also preferably, the report for the recognition of the possibility/impossibility of the direct parking is effected in the form of sound (sound/voice) output. With this, while viewing the vehicle rearward photographic image being displayed on the monitor, through the sound (sound/voice) outputted from the speaker, the driver can easily recognize whether the currently ongoing parking reversing is a direct parking or a part of a parking which requires a temporary stop in the middle thereof.

The inventive parking assist control that effects reporting for the driver's recognition of the possibility/impossibility of the direct parking which requires no turnaround for parking to the parking target position can be effectively realized whether its parking process is effected by automatic steering or its parking process is effected by manual steering. In the case of automatic steering, the driver can recognize in advance whether the reversing, once started, will continue until arrival at the final parking position or will discontinue temporarily in the middle thereof. Hence, it is possible to avoid the trouble of the driver's being shocked by unexpected vehicle stop. Further, in the case of the manual steering, for an inexperienced driver, as the possibility/impossibility of the direct parking is reported at each vehicle posture assumed at each occasion, the driver can enjoy parking operation with secure feel.

According to one preferred embodiment of the present invention, said report outputting section issues a reversing sound when the direct parking is possible and issues an alarm sound different from said reversing sound when the direct parking is not possible. With the above arrangement, the reversing sound (e.g. a beep-beep) which is heard by the driver at the time of direct parking in which the vehicle reaches the final parking position without stopping in the middle of the course is provided as a sound clearly distinct from an alarm sound (e.g. a bleep-bleep). When the direct parking is not possible, it is necessary to make a turnaround parking which requires a temporary stop in the course of the operation. Therefore, if the driver hears a sound different from the familiar reversing sound, the different sound can attract the driver's attention advantageously. With application of this mode of embodiment, when the direct parking is not possible, a reverse sound clearly distinct from the familiar sound that the driver hears when the direct parking is possible. Hence, in reversing for turnaround parking which requires temporary stop, it is possible to give the driver higher tension than the case of direct parking.

If the setting of the parking target position is effected automatically rather than by a manual operation by the driver, it becomes advantageously possible to determine, in the course of forwarding near a parking area, whether the vehicle has reached a point where a turnaround parking or a direct parking is possible and to report the result of this determination to the driver. For realizing this, according to one preferred embodiment of the present invention, said parking target position setting section is configured to calculate said parking target position from vehicle periphery information detected during forwarding of the vehicle. With this arrangement, the driver can recognize, during forwarding, whether a reverse parking is possible from the current position of the vehicle or not and also whether this ongoing parking is direct parking or a part of turnaround parking. Hence, the driver can stop and effect reverse parking at a desired position and in a desired manner of parking. The "vehicle periphery information" used above includes e.g. photographic image of the periphery of the vehicle obtained by a camera mounted on the vehicle, measured distance information of the periphery of the vehicle, vacant parking lot information outputted from the parking lot, etc.

For a driver not experienced in driving, the direct parking is easier than the turnaround parking. To this end, however, it is important that the vehicle be located at a point that allows direct parking. For this reason, according to one preferred embodiment of the present invention, said report outputting section is configured to report the possibility of direct parking to a driver currently engaged in forwarding, when said parking pathway determining section determines that the direct parking is possible. With this, by simply forwarding (i.e. traveling forward) in the vicinity of the parking lot, the driver can recognize an appropriate point for direct parking.

As the technique used by the parking target position setting section to detect an expected parking area, an image processing technique for extracting a space to be available for parking from a photographic image obtained by the camera during forwarding will be appropriate. And, the camera for such use can be at least one camera for capturing an image rearwardly of the vehicle. However, if there is (are) additionally provided a side camera for capturing an image laterally of the vehicle and/or a front camera for capturing an image forwardly of the vehicle, such arrangement will be more advantageous since the expected parking area can be detected from an even larger area around the vehicle.

MODES OF EMBODYING THE INVENTION

Next, an embodiment of the present invention will be described with reference to the accompanying drawings.

In this embodiment, there will be explained a parking assist apparatus configured to guide a vehicle comprising a passenger driven vehicle to a parking target area as a parking target position by means of guiding control. In this parking traveling process, a turnaround parking too can be carried out in case a direct parking for causing the vehicle to reach the parking target area by one-time reversing operation is not possible and a turnaround in vehicle traveling is needed.

[Basic Construction of Vehicle, etc.]

Figure 1:
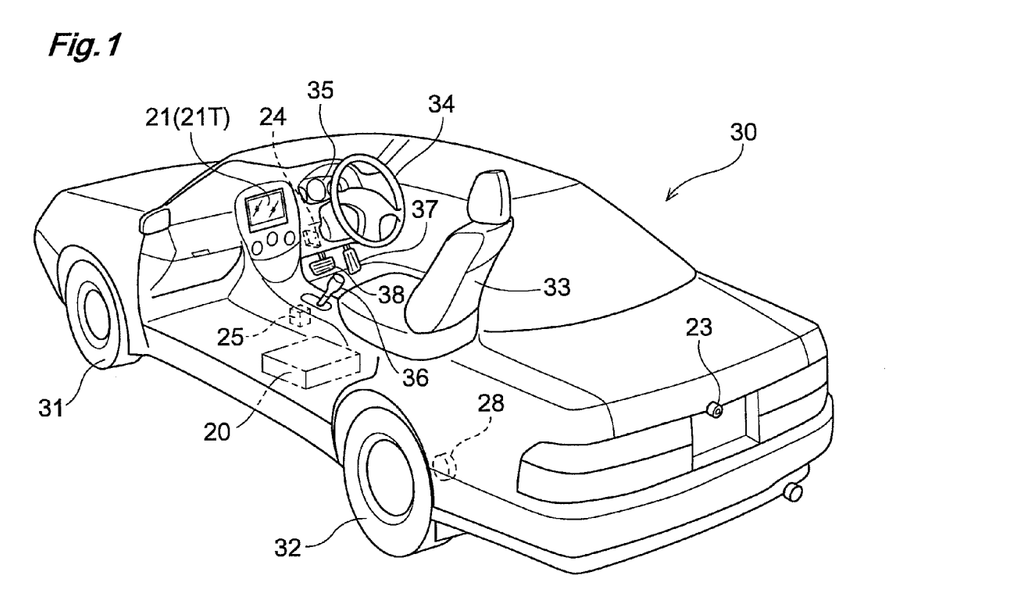
FIG. 1 is a perspective view showing a construction of a vehicle.
Figure 2:
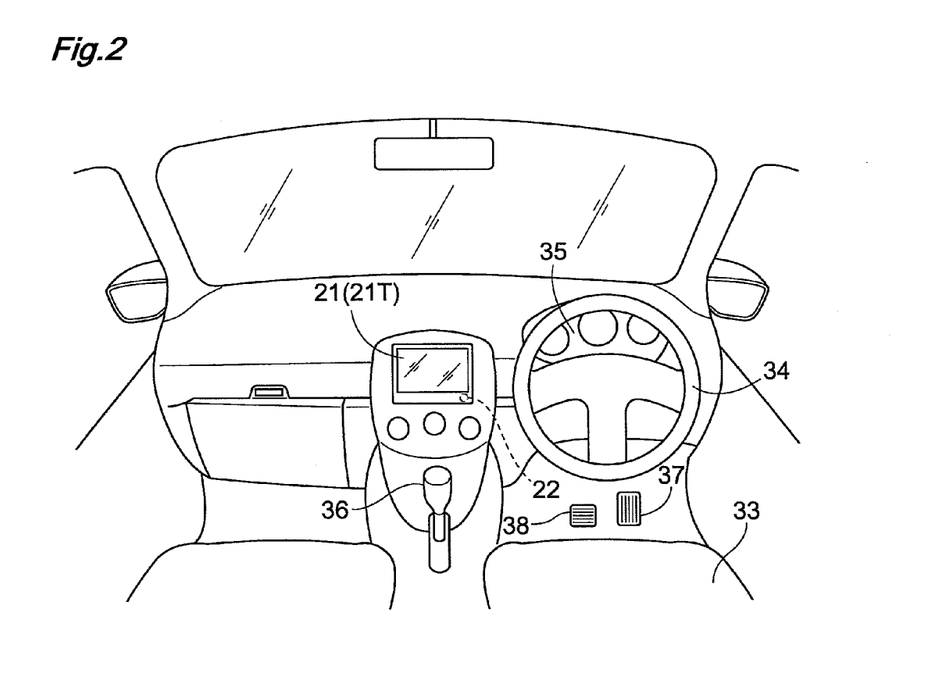
FIG. 2 is a perspective view showing a panel portion of the vehicle.
Figure 3:
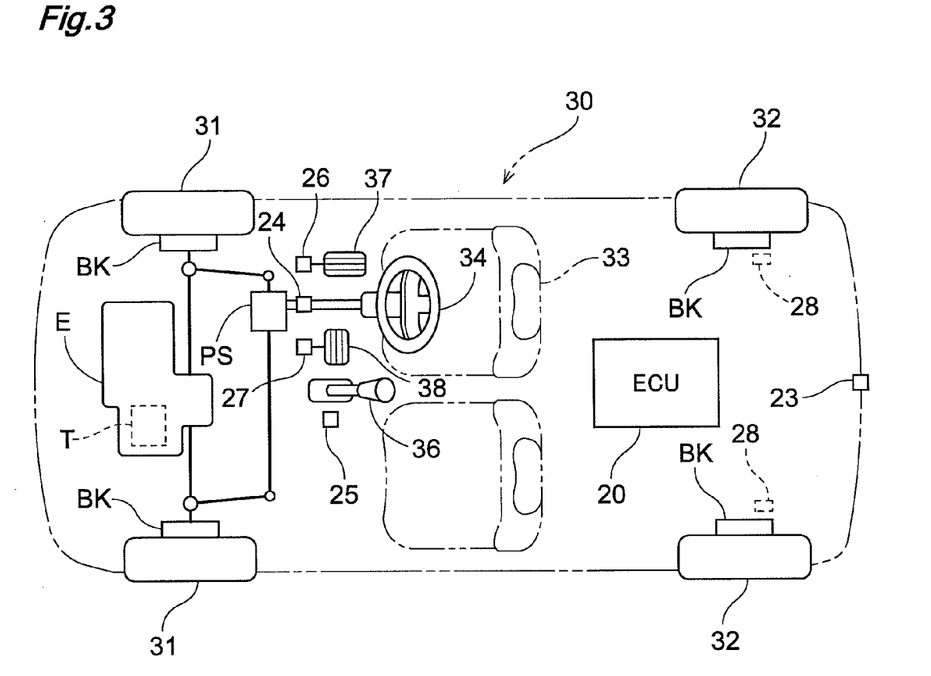
FIG. 3 is a plane view schematically showing the construction of the vehicle.

As shown in FIGS. 1 through 3, a vehicle 30 includes front wheels 31 and rear wheels 32 and inside the car interior, the vehicle includes a driver's seat 33 and a steering wheel 34. Forwardly of these, a panel 35 having various meters, etc. is mounted and on a side of the driver's seat 33, there is disposed a shift lever 36 for effecting speed changing operations.

The steering wheel 34 is operably coupled with a power steering unit PS configured to transmit a rotational operational force to the front wheels 31 for power-assisted steering. At the front section of the vehicle body, there are mounted an engine E and a speed changing mechanism T comprised of a torque converter, CVT, etc. for speed-changing the power from the engine E and transmitting the resultant, speed-changed power to the front wheels 31 for steering. Forwardly of the driver's seat 33, there are arranged in juxtaposition, an accelerator pedal 37 for controlling the traveling speed and a brake pedal 38 for activating braking devices BK for the front wheels 31 and the rear wheels 32 for applying braking forces to the front wheels 31 and to the rear wheels 32, respectively.

Adjacent the driver's seat 33 and at an upper position of the console, there is mounted a monitor 21 forming a touch panel 21T in its displaying face as the display device. The monitor 21 used herein is a liquid crystal type having backlight. Needless to say, a plasma display type or a CRT type can be employed instead. Further, the touch panel 21T used herein is a finger input type device of the pressure-sensitive or electro-static type capable of outputting a position touched by a finger or the like as location data. This monitor 21 has a speaker 22. Instead, the speaker 22 could be provided at a separate location such as inside the door. Further, in this embodiment, the monitor 21 is the one used also as a display device of the navigation system. Instead, a monitor dedicated for use for parking assist can be employed.

In the instant embodiment, as a device for capturing an image of view in the periphery of the vehicle, a camera 23 is mounted at the rear end of the vehicle 30. This camera 23 is a digital camera having such image pickup device as a CCD, CIS, etc and is configured to output the captured information as video information in realtime. Further, the camera 23 has a wide-angled lens so as to ensure a view angle from 120 to 140 degrees in the horizontal direction. Also, this camera 23 is mounted with an optical axis thereof having a depression angle of about 30 degrees, so that the camera 23 is capable of photographing an area extending about 8 meters rearwardly of the vehicle 30.

The vehicle 30 further includes a group of vehicle state detecting sensors for detecting the driving operation and moving states thereof. More particularly, in the operational line of the steering wheel 34, there is incorporated a steering sensor 24 for determining a steering operation direction (steering direction) and an operational amount (steering amount). In the operational line of the shift lever 36, there is incorporated a shift position sensor 25 for determining the shift position. In the operational line of the accelerator pedal 37, there is incorporated an accelerator sensor 26 for determining its operational amount. In the operational line of the brake pedal 38, there is incorporated a brake sensor 27 for detecting presence/absence of its operation.

Adjacent the rear wheels 32, there is provided a moved distance sensor 28 for determining a moved amount of the vehicle 30 from a rotational amount of the rear wheels 32. As this moved distance sensor 28, there may be employed a different type configured to obtain the moved amount from a rotational amount of a rotary line of the speed changing mechanism T. Further, this moved distance sensor 28 can be configured to determine a rotational amount of the front wheels 31 and a photo-interrupter type sensor or a pickup type sensor can be employed.

Figure 4:
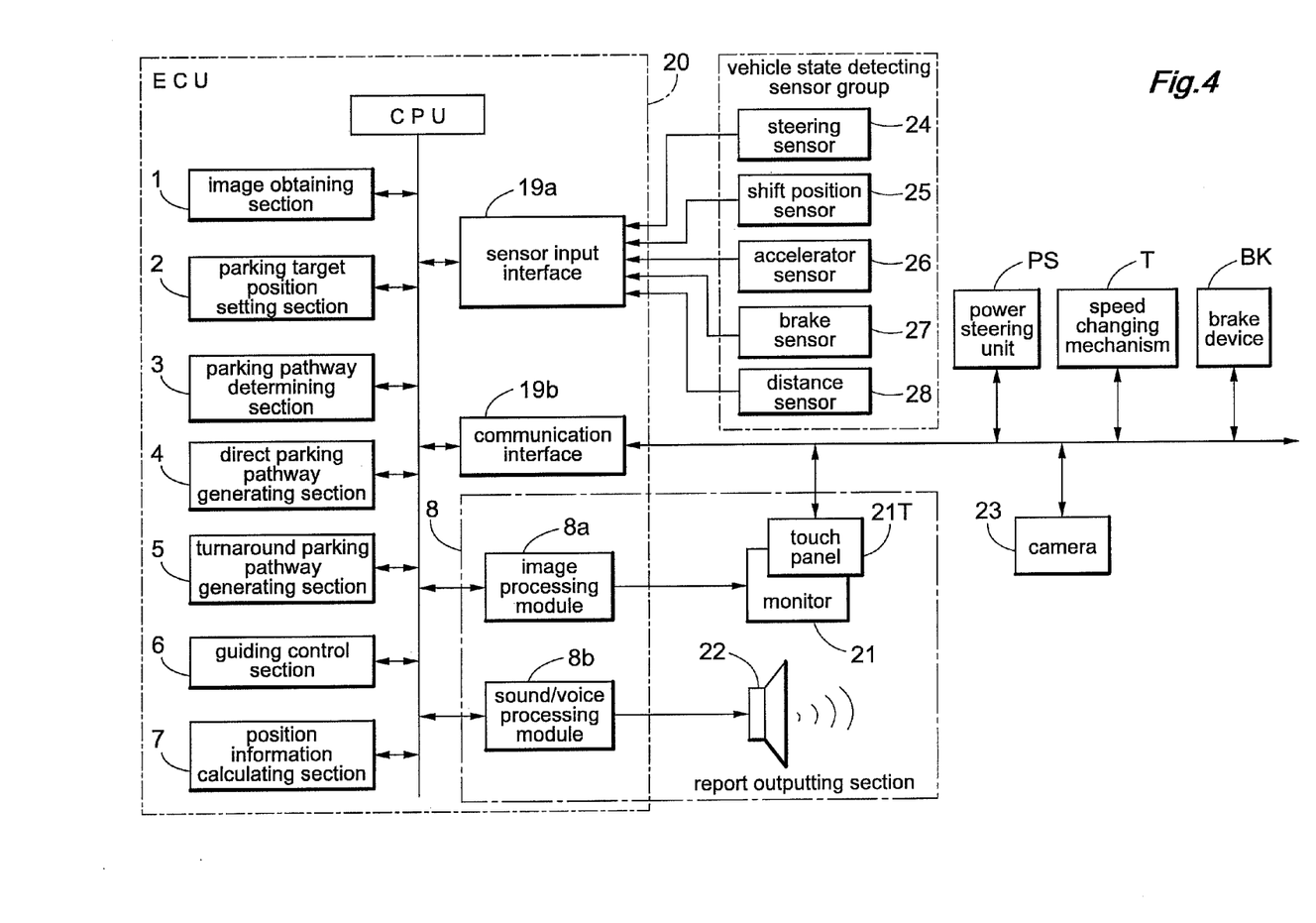
FIG. 4 is a block diagram showing principal functions of a control system.

And, at the center position of the vehicle 30, there is disposed an ECU 20 constituting the core component of the inventive parking assist apparatus. This ECU 20, as shown in FIG. 4, includes a sensor input interface 19a, a communication interface 19b, etc. as input/output interfaces for effecting inputting and outputting of information and further includes a microprocessor, a DSP or the like for processing the information obtained via the input/output interfaces. Further, some or all of these input/output interfaces can be incorporated within such processor.

To the sensor input interface 19a, there are connected the group of vehicle state detecting sensors described above such as the steering sensor 24, for detecting driving operations, moving states, etc. Further, as the communication interface 19b, a car mounted LAN is employed and to this, not only the touch panel 21T and the camera 23 are connected, but also connected are such control units as the power steering unit PS, the speed changing mechanism T, the braking devices BK, to enable data transmission therebetween.

[Construction of Control System]

The inventive parking assist apparatus, as shown in FIG. 4, includes the report outputting section 8 for outputting information to be reported to the driver in the form of graphic information or sound/voice information. The components included in the ECU 20 for constituting this report outputting section 8 are an image processing module 8a and a sound/voice processing module 8b each being constituted from a DSP. Photographic information including various kinds of information for GUI and assisting image for vehicle guiding generated by the image processing module 18a will be displayed on the monitor 21. The sound/voice guide for vehicle guiding or alarm sound for emergency generated by the sound/voice processing module 8b are outputted from the speaker 22.

Of those functional sections that are constructed within the ECU 20 and whose functions are created substantially through execution of program, the ones related in particular to the present invention are an image obtaining section 1, a parking target position setting section 2, a parking pathway determining section 3, a direct parking pathway generating section 4, a turnaround parking pathway generating section 5, a guiding control section 6, and a position information calculating section 7.

The image obtaining section 1 obtains image data captured by the camera 23 through the communication interface 19b and effects a necessary process thereon and transfers the resultant photographic image to other functional section and/or the image processing module 8a. The parking position setting section 2 calculates a parking position PS as a reference for parking the vehicle 30, based on the image data obtained by the image obtaining section 1 and also sets a parking target area G as a parking target position, based on the parking position PS through an automatic processing and a manual operation. Incidentally, in the instant embodiment, as shown in FIG. 5 and FIG. 6, as the parking target area G, there is set an area delimited by two lot delimiting lines W (parking lot delimiting lines) marked on the road surface.

Figure 5:
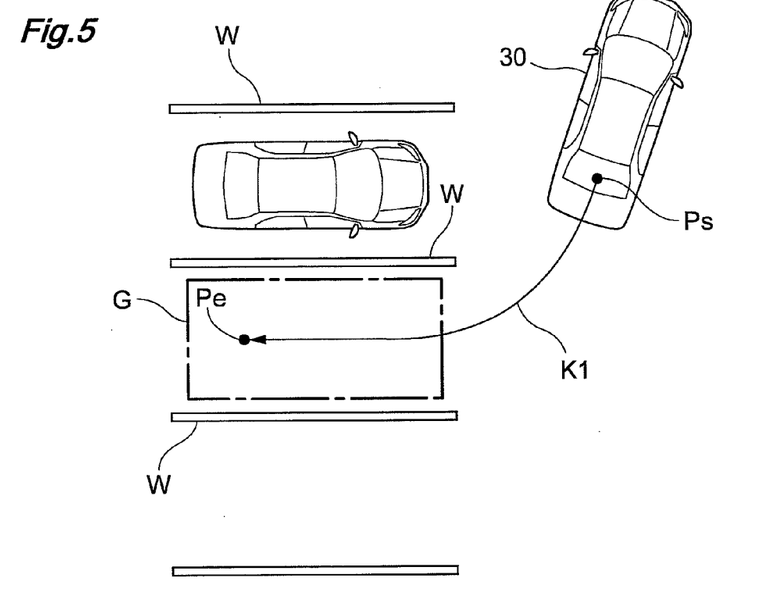
FIG. 5 is a plane view showing a parking pathway or the like in the case of a direct parking.

The direct parking pathway generating section 4 generates a direct parking pathway K1 for realizing the direct parking, as illustrated in FIG. 5. This direct parking pathway K1, from a stop position Ps to a parking complete position Pe, can include a straight portion as a portion thereof or can be a straight line throughout. But, this path K1 can be represented by a single curve line substantially. The turnaround parking pathway generating section 5 generates a turnaround parking pathway K2 for realizing the turnaround parking, as illustrated in FIG. 6. This turnaround parking pathway K2 includes, from the stop position Ps to the parking complete position Pe, a turnaround point P1 and a turnaround forwarding stop position P2. More particularly, the turnaround parking pathway K2 consists of a turnaround reversing path K21 from the stop position Ps to the turnaround position P1, a turnaround forwarding path K22 from the turnaround point P1 to the forwarding stop position P2 and a final parking path K23 from the forwarding stop position P2 to the parking complete position Pe. Incidentally, the turnaround path consisting of the turnaround reversing path K21 and the turnaround forwarding path K22 can be repeated by a plurality of times if necessary. Also, the final parking pathway K23 is equivalent to the direct parking pathway K1 and the "turnaround parking" is completed eventually in the form of "direct parking" from the forwarding stop position P2 to the final parking path K23. The algorithms for generating the direct parking pathway K1 and the turnaround parking pathway K2 are known in the art, and the above-described Patent Document 1 and Patent Document 2 can be referred to for information thereof.

Figure 6:
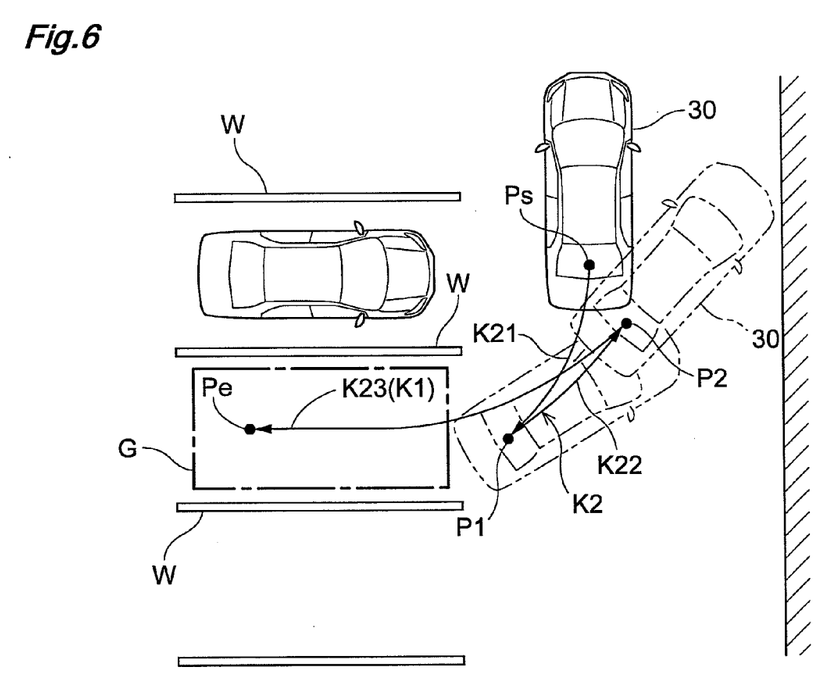
FIG. 6 is a plane view showing a parking pathway or the like in the case of a turnaround parking.

The parking pathway determining section 3 effects determination of possibility of "direct parking" for directly parking the vehicle 30 from the stop position PS to the parking target area G by single reversing (see FIG. 5) and possibility of "turnaround parking" for parking the vehicle 30 from the stop position PS to the parking target area G through turn-around, i.e. reversing/forwarding switchover (see FIG. 6). In this determination, the direct parking is determined possible if generation of the direct parking pathway K1 for realizing direct parking by the direct parking pathway generating section 4 becomes possible. Whereas, the turnaround parking is determined possible if the direct parking is not possible and then generation of the turnaround parking pathway K2 for realizing the turnaround parking by the turnaround parking pathway generating section 4 becomes possible.

The position information calculating section 7 obtains a current vehicle position required for guiding the vehicle 30 and a position of the parking target area G relative to the vehicle 30. More particularly, the position information calculating section 7 effects a vehicle position detecting operation for detecting the position information of the vehicle 30 which varies in accordance with movement of the vehicle 30 and a parking target position detecting operation for detecting the relative positional relationship relative to the parking target area G which varies according to movement of the vehicle 30. These operations are effected, based on the image data obtained by the camera 23, the movement amount of the vehicle 30 obtained by the movement distance sensor 28 and the steering amount of the steering wheel 34 determined by the steering sensor 24.

The guiding control section 6, based on the result of determination made by the parking pathway determining section 3, effects direct parking based on the direct parking pathway K1 generated by the direct parking pathway generating section 4 or turnaround parking based on the turnaround parking pathway K2 generated by the turnaround parking pathway generating section 5. In doing these, reference is made to the position information from the position information calculating section 7. With reference to the position information from the position information calculating section 7, the guiding control section 6 can realize the controlling operation through guiding for causing the vehicle 30 to travel along the direct parking pathway K1 or the turnaround parking pathway K2. In this regard, a manual steering can be partially incorporated in such a manner that the guiding control section 6 limits the automatic steering involving controlling of the power steering unit PS, the speed changing unit T, the braking device BK, to the reversing only, while leaving the forwarding for manual control. In any case, advantageously, this guiding control unit 6 causes the monitor 21 to display the steering direction or the steering amount or causes the speaker 22 to output the steering direction or the steering amount, by sending guiding information to the image processing module 8a or the sound/voice processing module 8b.

As long as the relative positional relationship between the parking target area G and the vehicle 30 is changing, by predetermined timing, the direct parking pathway generating section 4 will keep its calculation of the possibility of generation a direct parking pathway and the turnaround parking pathway generating section 5 will keep its calculation of the possibility of generation of a turnaround parking pathway. Therefore, the parking pathway determining section 3 can determine the possibility/impossibility of direct parking or turnabout parking by similar timing. For instance, if direct parking becomes possible in the midst of a turnaround parking operation, from this point on, the vehicle can be guided by direct parking. Or, if direct parking becomes impossible for some reason such as an erroneous steering operation in the midst of a direct parking operation, the guiding will be switched over to a turnaround parking for guiding the vehicle from this point.

If the parking pathway determining section 3 determines which of the parking processes, i.e. either direct parking or turnaround parking, is currently effected or either one parking process, i.e. the direct parking or the turnaround parking, has been switched over to the other parking process, reporting of this to the driver is effected by the report outputting section 8. In particular, in the direct parking process, the vehicle travels in reverse from the stop position Ps to the parking complete position Pe whereas in the turnaround parking process, the vehicle needs to reverse to the turnaround position P1 and then make a temporary stop. For this reason, it is important to report to the driver currently engaged in reversing in which parking process this reverse parking is being carried out. Therefore, information relating to this, through will be detailed later, will be outputted by the report outputting section 8, in a graphical reporting mode using the monitor 21 or in a voice/sound (i.e. audible) reporting mode using the speaker 22 or in both of these modes, in accordance with an instruction from the parking pathway determining section 3.

Next, the flow of the parking assist control by the parking assist apparatus constructed as described above will be explained with reference to the flowchart in FIG. 7.

When a reverse travel parking is effected by the parking assist control, the vehicle 30 is stopped at a position nearby a parking space and this parking space is set as a parking target area G (i.e. a parking target position) (#01). With this setting, there is set a guiding mode for guiding the vehicle 30 to the parking target area G by causing the vehicle 30 to reverse, based on the stop position of the vehicle 30, the posture of the vehicle 30 and the parking target area G.

Figure 8:
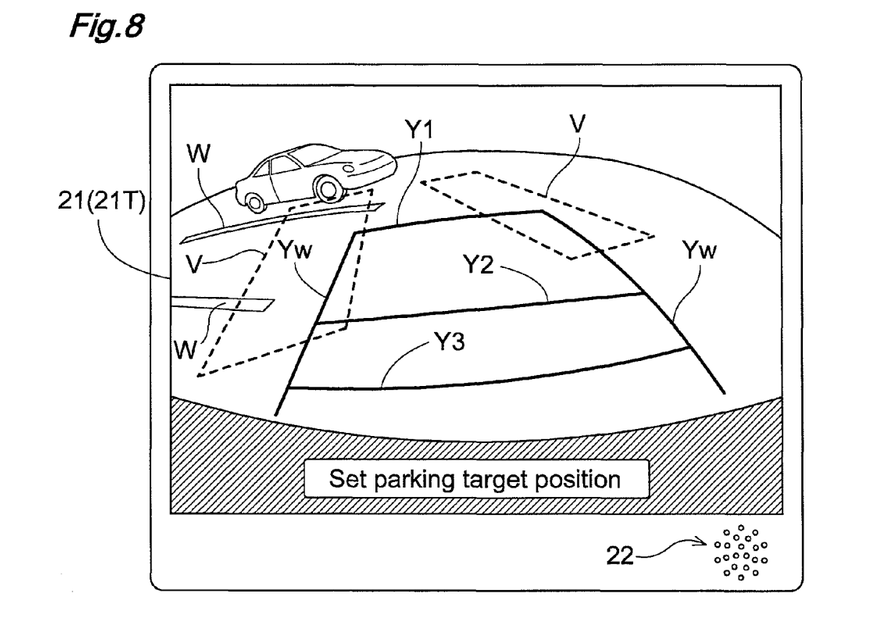
FIG. 8 is a front view of a monitor showing an example of monitor screen prior to setting of a parking target position.

In setting the parking target area G, the parking target position setting section 2 displays an image captured by the camera 23 on the monitor 21 as shown in FIG. 8. In this image, on a rearward periphery image of the vehicle 30 captured by the camera 23, an indicator consisting of a pair of right and left vehicle width lines Yw, expected advancement lines Y1, Y2, Y3 corresponding respectively to 5 m (meters), 3 m, 1 m are displayed in a superposing processing. In this screen, a pair of right and left frame-like regions of interest V and in this screen, there is displayed also a message such as "Set a parking target position." (this can be outputted as a voice message). The image shown on the monitor 21 at this point is reversed in the right/left direction, simulating a mode of display shown on the rear view mirror.

Figure 9:
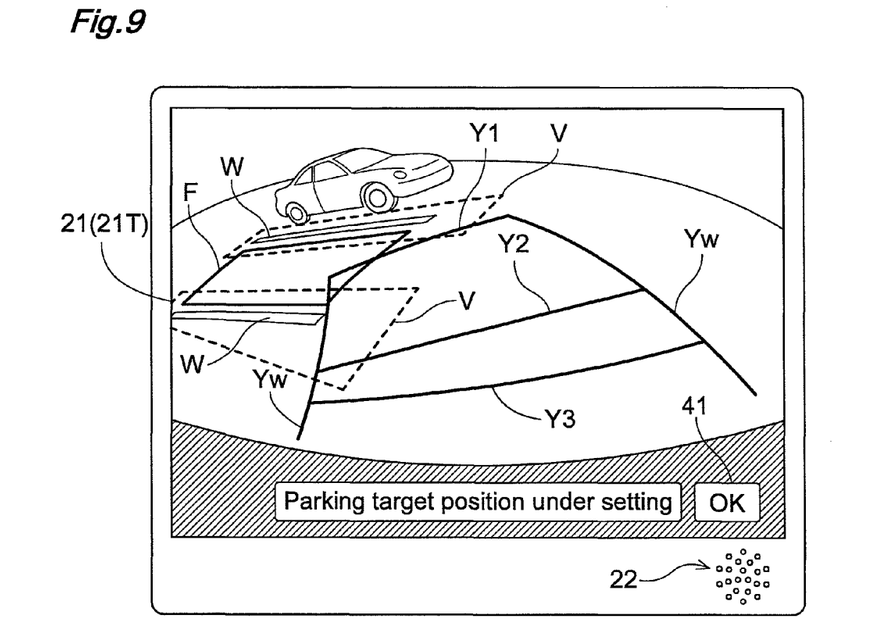
FIG. 9 is a front view of a monitor showing an example of monitor screen at the time of starting a direct parking.

Under this display condition, in response to an operation of the steering wheel 34, the region of interest V is moved by a distance corresponding to the amount of this operation. With this movement, if the region of interest V reaches a position overlapped with the lot delimiting line W, as shown in FIG. 9, the parking target position setting section 2 displays a frame-like area F in the region delimited by the lot delimiting lines W. If the position where this frame-like area F is being displayed is the parking target area G, the driver will operate an OK button 41 on the monitor 21, whereby the position of the frame-like area F is stored as the parking target area G.

Incidentally, the mode of operation for setting the frame-like area F is not limited to the one described above. Instead, the driver can operate a switch or the like through the touch panel 21T, thereby to move and set the frame-like area F displayed on the monitor 21.

Upon setting of the parking target area G as described above, the parking target position setting section 2 calculates a road surface position indicated by the frame-like area F displayed on the monitor 21 and the position of the currently stopped vehicle 30 as information in two-dimensional coordinate system. Then, information indicative of positional relationship between the stopped position of the vehicle 30 and the parking target area G is stored at a predetermined memory address in the ECU 20 as information digitized by the two-dimensional coordinate system.

Upon the storage of the information indicative of positional relationship between the stopped position of the vehicle 30 and the parking target area G, the direct parking pathway generating section 4 effects generation of a direct parking pathway. And, if this generation is successful, the generated direct parking pathway information is stored at a predetermined address. Whereas, if the generation is unsuccessful, a flag indicative of impossibility of direct parking is set. And, in the case of impossibility of direct parking, the turnaround parking pathway generating section 5 effects generation of a turnaround parking pathway. And, if this generation is successful, this turnaround parking pathway information is stored at a predetermined memory address. Whereas, if the generation is unsuccessful, a flag indicative of turnaround parking being not possible is set. Based upon the results of generations of parking pathways by the direct parking pathway generating section 4 and the turnaround parking pathway generating section 5 described above, the parking pathway determining section 3 determines possibility of direct parking or impossibility of direct parking (this leads to need of a turnaround parking) (step #02). Incidentally, though not shown in the flowchart of FIG. 7, there can sometimes occur a case where parking is still impossible even if a turnaround is effected. In such case, a reporting of parking being impossible is made, thereby to end this control process.

Figure 10:
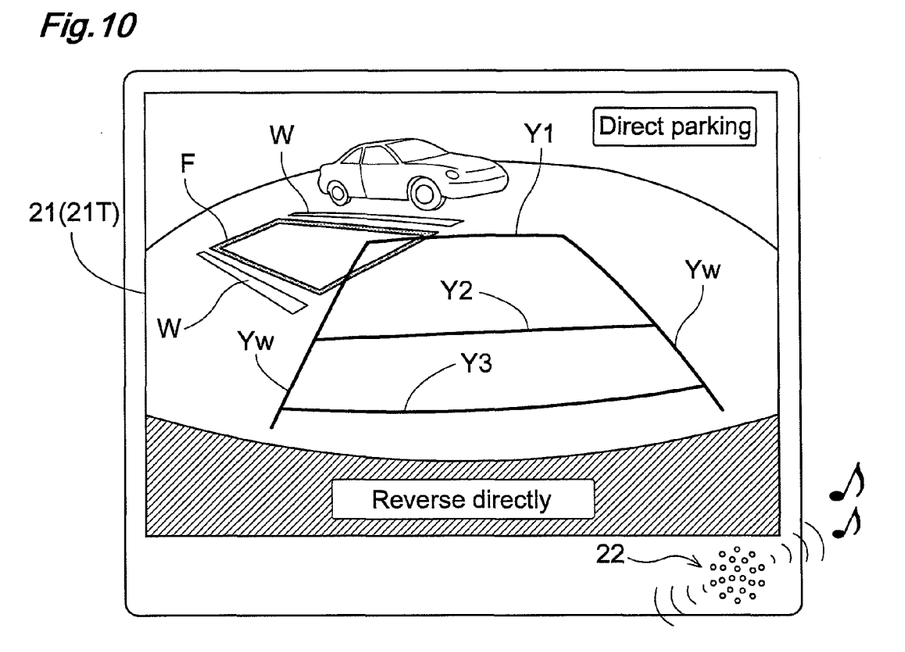
FIG. 10 is a front view of the monitor showing an example of monitor screen at the time of starting a direct parking.

Through the above-described determination process, if the parking pathway generating section 3 selects direct parking (step #03 "direct parking branch"), reporting of direct parking information is effected by the report outputting section 8 (step #21). In this embodiment, as this reporting of direct parking information", as shown in FIG. 10, the monitor 21 displays the characters "direct parking" together with the back monitoring image and also the frame-like area F is displayed in green color. Simultaneously, the speaker 25 issues a reversing sound (e.g. a beep-beep) commonly used at the time of reversing.

After the direct parking is effected to cause the vehicle 30 to travel by a predetermined distance (step #22), a determining operation by the parking pathway determining section 3 is carried out again (step #23). If the parking pathway determining section 3 selects a direct parking through this determining operation (step #24: "direct parking branching"), the process then checks whether the vehicle 30 has reached the parking complete position Pe as the parking target position or not (step #25). If it is found that the vehicle 30 has not yet reached the parking complete position Pe (NO branching at step #25), the process returns to step #22 to continue the direct parking. Whereas, if it is found that the vehicle 30 has reached the parking complete position Pe (YES branching at step #25), a stopping instruction is issued (step #26), whereby stopping of the vehicle 30 is awaited and then this reverse travel parking operation is completed.

Figure 11:
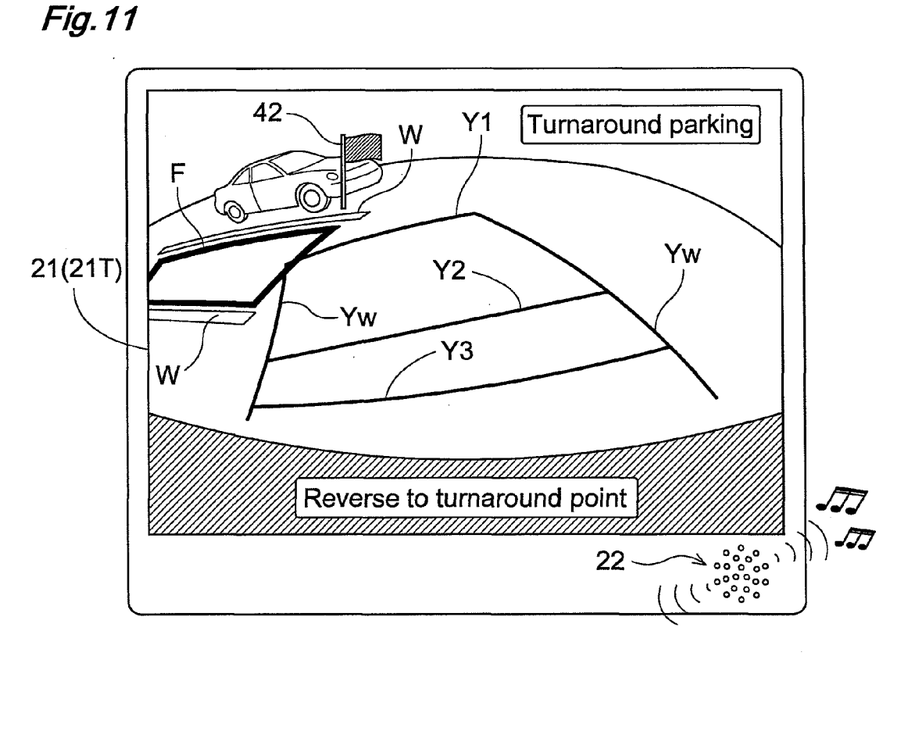
FIG. 11 is a front view of the monitor showing an example of monitor screen at the time of start of turnaround parking.

If the parking pathway determining section 3 selects turnaround parking at step #03 or step #24 ("turnaround parking branching" at step #03 or "turnaround parking branching" at step #24), reporting of the turnaround parking information by the report outputting section 8 is effected (step #31). In this embodiment, as shown in FIG. 11, the monitor 21 displays the characters "turnaround parking" and a message "Reverse to turnaround point" together with the back monitoring image and the frame-like area F is displayed in red color. Further, in this embodiment, based on turnaround parking pathway information, a flagged pole 42 indicating of the turnaround point P is also displayed. So, it is possible to make the driver clearly recognize the presence of the turnaround point P and the need to stop there. Simultaneously, the speaker 22 issues an alarm sound (e.g. a bleep-bleep sound) distinct from the reversing sound (a beep-beep) which was issued at the time of direct parking. With such mode of reporting, at the time of turnaround parking which requires a temporary stop, it is possible to give the driver a feel of tension higher than the case of direct parking in which the vehicle travels straight to the final parking position without making any temporary stop. Incidentally, the mode of marker indicating of the turnaround point P1 is not limited to the flagged pole 42. Instead, a pole without any flag or any other shape body such as a road cone can be employed.

After the turnaround parking is effected to cause the vehicle 30 to travel by a predetermined distance (step #32), the determining process by the parking pathway determining section 3 is effected again (step #33). If the parking pathway determining section 3 selects a turnaround parking again through this determining process ("turnaround parking branching" at step #34), the process checks whether the vehicle 30 has reached the turnaround point P1 or not (step #35). If it is found that the vehicle 30 has not yet reached the turnaround point P1 (NO branching at step #35), the process returns to step #32 to continue the turnaround parking.

If the parking pathway determining section 3 selects the direct parking at step #34 ("direct parking branching" at step #34), that is, in the course of reversing steering to the turnaround point P1, a parking pathway enabling direct parking has been found, the process jumps to step #21 and direct parking information is reported (step #22) and the above-described direct parking is effected.

Figure 12:
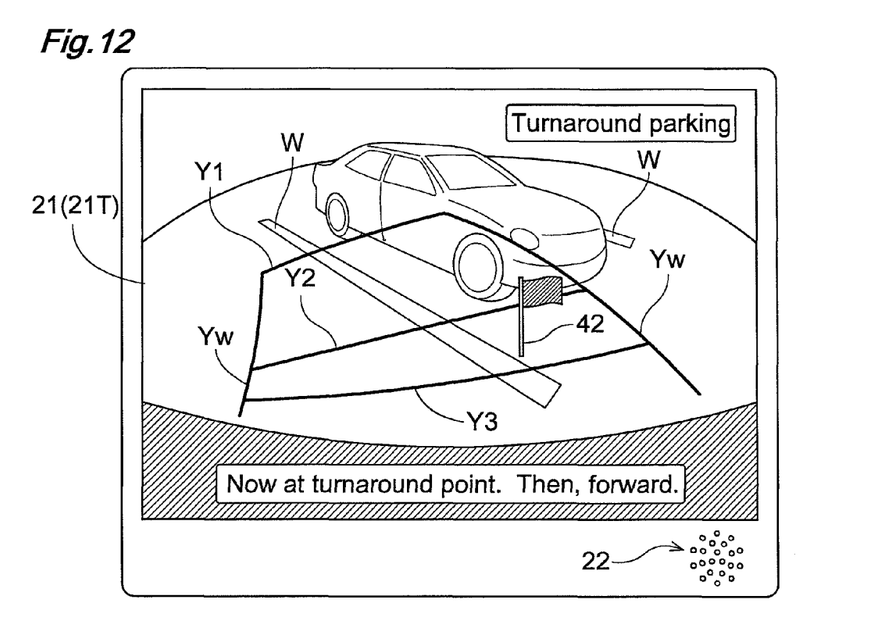
FIG. 12 is a front view of the monitor showing an example of monitor screen at the time of start of parking when a turnaround point has been reached in a turnaround parking.

If it is found at the determining step of step #35 that the vehicle 30 has reached the turnaround point P1 (YES branching at step #35), as shown in FIG. 12, the arrival of the vehicle at the turnaround point P1 and start of subsequent forwarding are reported by the report outputting section 8 and a turnaround forwarding by a predetermined distance is effected (step #36). Then, the determining operation by the parking pathway determining section 3 is effected again (step #37). If the parking pathway determining section 3 selects a turnaround parking again through this determining process ("turnaround parking branching" at step #38), the process checks whether the vehicle 30 has reached the turnaround forwarding stop position P2 or not (step #39). If it is found that the vehicle 30 has not yet reached the turnaround forwarding stop position P2 (NO branching at step #39), the process returns to step #36 to continue the turnaround forwarding. On the other hand, if it is found that the vehicle 30 has reached the turnaround forwarding stop position P2 (YES branching at step #39), the process determines that another turnaround parking is needed and returns to step #32 to resume reversing to a new turnaround point P1 in the turnaround parking.

If at step #38, the parking pathway determining section 3 selects direct parking ("direct parking branching" at step #38), that is, if a parking pathway enabling direct parking is found by the forwarding steering to the turnaround forwarding stop position P2, the process jumps to step #21, and the direct parking information is reported (step #22) and the above-described direct parking is effected.

As may be understood from the explanation of the parking assist control above, in case the vehicle 30 is parked from the stop position Ps as the parking start position to the parking complete position Pe as the parking target position, different reports are made between the case where the vehicle can reach the parking complete position Pe with the currently ongoing reversing and the case where a turnaround is needed and the vehicle needs to stop at the turnaround point. With this, the driver can recognize whether the process is now under the direct parking or under the turnaround parking, so that smooth parking with secure feel is made possible.

Other Embodiments

1

Figure 7:
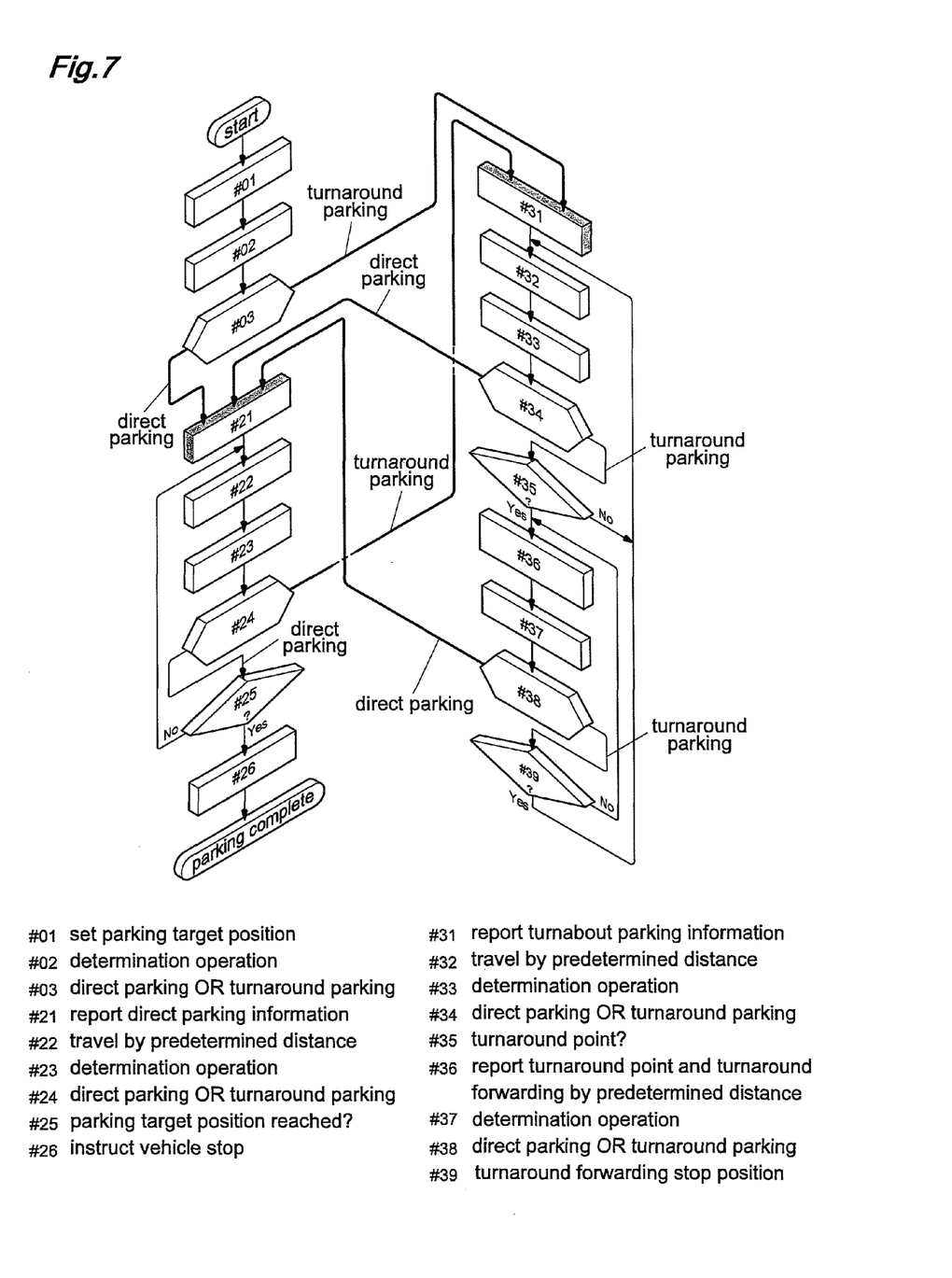
FIG. 7 is a flowchart showing the process of parking assist control.
Figure 13:
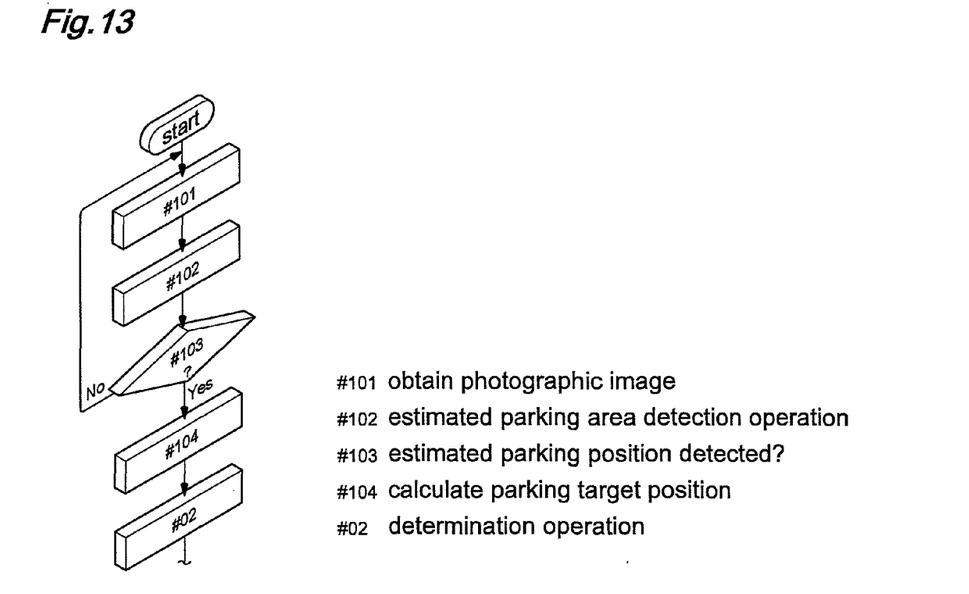
FIG. 13 is a partial flowchart showing control steps different from the flowchart of FIG. 7, in a parking assist control relating to a second embodiment.

In the foregoing embodiment (first embodiment), the driver parks the vehicle 30 at a position nearby a parking space and sets a parking target area G as a parking target position (see #01 in FIG. 7). In this second embodiment, while the vehicle is forwarding at a position nearby a parking space, the parking target position setting section 2 of the ECU 20 sets a parking target area G based on photographic image transmitted from the camera 23 and the parking pathway determining section 3 determines possibility of "direct parking" and "roundabout parking" relative to this set parking target area G. Namely, in this second embodiment, during forwarding nearby a parking space (for example a case where a forwarding is going on as the driver is looking for a parking space available for parking, that is, the parking target area is not set yet), if the vehicle 30 reaches a position allowing "turnaround parking", reporting of possibility of "roundabout parking" is effected by the ECU 20 or if the vehicle 30 reaches a position enabling "direct parking", reporting of "direct parking" being is possible is effected by the ECU 20. Next, an example of such parking assist control will be explained with reference to the flowchart in FIG. 13. This parking assist control is initiated in response to an operation of a button or a switch that instructs start of parking assist control by the driver when the vehicle 30 is approaching a parking space. First, as an example of vehicle periphery information, the image obtaining section 1 obtains image data as photographic image from the camera 23. Incidentally, in the first embodiment, only a rear view camera for capturing an image of the view rearwardly of the vehicle is employed as the camera 23. However, additional provision of a side view camera for capturing an image laterally of the vehicle and/or a front view camera for capturing an image forwardly of the vehicle will be advantageous, and all photographic images from such cameras can be utilized for parking assist control. Moreover, an overhead view can be created from these photographic images and based on this overhead view, a location for parking can be determined. In any case, the process effects an estimated parking area processing for detecting an estimated parking area as a candidate for possible parking from the obtained photographic image (an example of vehicle periphery information) with using any appropriate image processing technique (#102). In this estimated parking area processing, there is detected an area where the vehicle 30 can be parked (e.g. a space larger than the vehicle 30 for allowing parking of the vehicle 30 therein). According one typical processing of this kind, a white line marked on the road surface for indicating a parking area is image-recognized through image processing of a photographic image from the camera 23 and an area delimited by the white line is recognized as an estimated parking area. Further, in the case of absence of such maker as a white line, it is also possible to employ a technique in which an area having a surface looking like a road surface and ensuring space sufficiently larger than the vehicle 30 is recognized as an estimated parking area. Further alternatively, it is also possible to employ a technique in which a plurality of photographic images of different photographic positions from the camera 23 are utilized and a moving stereo image technique is employed to find a three-dimensional space available for parking is found and this is set as an estimated parking area. Needless to say, in case a plurality of cameras 23 are arranged to create a stereo image, the standard stereo image technique rater than a moving stereo image technique will be employed.

In case no estimated parking area is detected from obtained image data (NO branching at step #103), the process returns to step #101 to obtain photographic in a next sampling. If an estimated parking area is detected (YES branching at step #103), from this estimated parking area, a parking target area G as a parking target position is calculated (setting of the area and the position of the parking target area G) (step #104). In this second embodiment, the parking target position setting section 2 effects the estimated parking area processing and the parking target area calculating process. Upon completion of calculation of the parking target area G, then, the process moves onto the control step at step #02 in FIG. 7 and thereafter, the process will effect the control operations described hereinbefore with reference to FIG. 7.

Incidentally, as the vehicle periphery information for use in the detection of the estimated parking area, in addition to the above-described photographic images, it is possible to use also information detected by an obstacle detecting means such as an ultrasonic sensor, a distance laser, etc. That is, information from these obstacle detecting means are utilized for detection of space available for parking.

2

Figure 14:
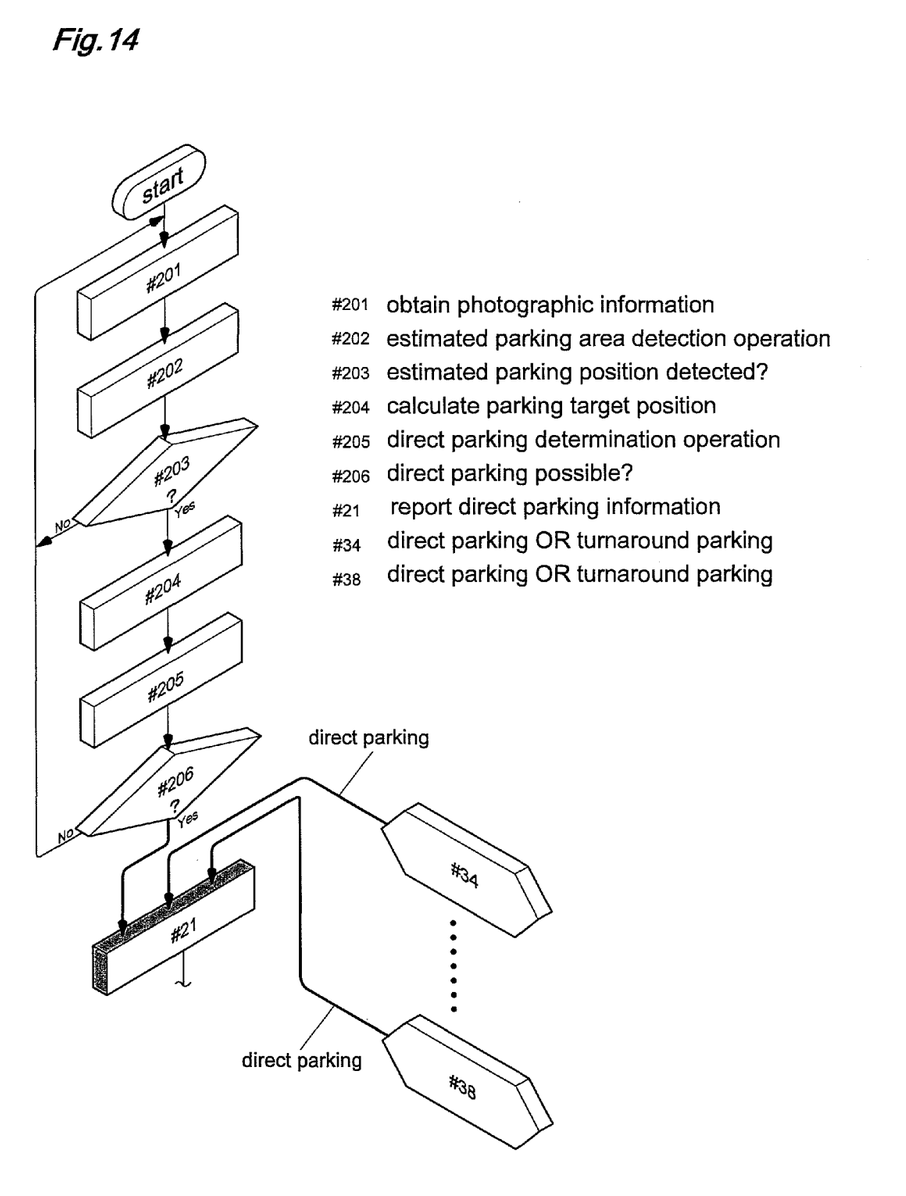
FIG. 14 is a partial flowchart showing control steps different from the flowchart of FIG. 7, in a parking assist control relating to a third embodiment.

In the above second embodiment, instead of a driver, the parking target position setting section 2 sets the parking target area G as a parking target position. In this third embodiment too, the parking target position setting section 2 instead of a driver sets the parking target position during forwarding. Further, for this parking target area G, the parking pathway determining section 3 and the direct parking pathway determining section 4 effect determinations whether direct parking to this parking target area G is possible or not and only when it is found that direct parking is possible, reporting is made to the driver that the a point allowing "direct parking" has been reached. Namely, in this third embodiment, there is provided an advantage that the driver can recognize a point allowing direct parking which is easier than a turnaround parking, while the driver is traveling forward in the vicinity of a parking space. An example of such parking assist control will be explained next with reference to the flowchart of FIG. 14. In this parking assist control too, the parking assist control is initiated in response to a driver's operation of a button, a switch or the like for instructing initiation of parking assist control when the vehicle 30 is approaching a parking space.

The operations from step #201 to step #204 are same as the operations from step #101 to step #104 in the second embodiment. Therefore, explanation thereof will be omitted here. After calculation of a parking target area G at step #204, a direct parking determining operation for determining whether a direct parking to this parking target area G is possible or not is effected by the parking pathway determining section 3 and the direct parking pathway determining section 4 (#205). If it is found that direct parking is not possible (NO branching at step #206), the process returns to step #201 to obtain photographic image of a next sample. On the other hand, if it is found that direct parking is possible (YES branching at step #206), the process moves onto the control step at step #21 in FIG. 7 and thereafter control operation described hereinbefore with reference to FIG. 7 will be effected. Incidentally, in all of the embodiments of this invention, in case both direct parking and turnaround parking are needed, a reporting of possibility of the direct parking alone can be effected and reporting of possibility of turnaround parking may be omitted.

Modified Embodiments

1

In the above-described embodiments, the report outputting section 8 for effecting reporting to cause the driver engaged in a traveling for parking to recognize the possibility/impossibility of direct parking based upon result of determination by the parking pathway determining section 3 outputs the reporting for distinguishing between direct parking and turnaround parking in both graphic mode and audible mode. Needless to say, the reporting can be made only in either one of the modes. Further, the graphic mode is not limited to the above-described mode of color changing in which the frame-like area F is displayed in green in the case of direct parking and the frame-like area F is displayed in red in the case of turnaround parking. For instance, the distinction between the time of direct parking and the time of turnaround parking can be made by distinction of showing the frame-like area F by a solid line, a broken line, a semi-transparent line, etc. Or, the distinction can be made by illumination and flashing. In this way, for making a driver recognize the time of direct parking and the time of turnaround parking, any suitable various visual information communicating design can be employed. Furthermore, as the mode of reporting, any other reporting mode than the graphic mode or audible mode, such as a body feel reporting (or informing) mode by means of vibration or thermal shock reporting mode can be employed.

Further, the audible (sound/voice) reporting mode is not limited to the one described above in which a common reverse sound (beep-beep) is outputted at the time of direct parking and an unusual sound (bleep-bleep sound) is outputted at the time of turnaround parking. For instance, it is possible to employ a different audible reporting mode in which a relative relaxing musical sound is outputted at the time of direct parking and a relatively tensed musical sound is outputted at the time of turnaround parking.

2

The vehicle guiding control by the guiding section 6 is not limited to the automatic steering described above. For instance, the vehicle guiding control can comprise only displaying on the monitor 21 of a path indicating a direction of movement of the vehicle, displaying of a steering direction and steering amount or outputting a steering direction and steering amount by means of a voice from the speaker 22 and the actual steering operation is left to the driver.

3

In the above-described embodiments, the parking traveling from the traveling of the vehicle from the stopping position Ps as the parking start position to the parking complete position Pe as the parking target position and parking the vehicle at this position Pe is effected by automatic steering by the guiding control section 6. Instead, the automatic steering by the guiding control section 6 can be limited to the direct parking pathway K1 (if desired, this can include the final parking pathway K23 in the turnaround parking pathway K2). Conversely, the automatic steering by the guiding control section 6 can be limited to the turnaround reversing path K21 or the turnaround forwarding path K22 or both of these in the turnaround parking pathway K2. Further alternatively, the automatic steering by the guiding control section 6 can be omitted at all, so that the vehicle 30 will be parked only by a manual steering operation by the driver. In this case, in the free parking process by the driver, under a condition of direct parking is possible, this possibility will be reported to the driver. Whereas, under a condition of direct parking being impossible and turnaround parking being possible or a condition of any parking at all being impossible, this will be reported to the driver.

4

In the above-described embodiments, in the parking assist control, when direct parking becomes impossible, a turnaround parking pathway is generated and the parking assist is switched over to the turnaround parking. Instead, the generation of the turnaround parking pathway can be omitted and only the informing of direct parking being possible or not can be made not only at the time of start of parking, but also during traveling for parking. In this case, the turnaround parking pathway generating section 5 can be omitted.

5

In the above-described embodiments, it was explained that the parking target position setting section 2 sets the parking target area G as the parking target position, based upon the stop position PS calculated based on the image data obtained by the image obtaining section 1. However, the construction of the parking target position setting section 2 can vary many ways. For instance, it is possible to employ a construction wherein a distance to an object present in the periphery is determined with use of an ultrasonic sonar and based on the result of this determination, the parking target area G as the parking target position is set. According to still further possible construction, a temporary stop position where the driver has stopped the vehicle temporarily is used as a reference and a position having a predetermined relative positional relationship relative to this reference is set as the parking target area G as the parking target position. Further alternatively, it is possible to employ a technique combining an image processing of photographic image from the camera 23 and a determining process using an ultrasonic sonar.

INDUSTRIAL APPLICABILITY

The present invention is applicable to a parking assist apparatus for assisting a reversing parking operation of an automobile, a work vehicle, or the like.

DESCRIPTION OF REFERENCE MARKS

2: parking target position setting section
3: parking pathway determining section
4: direct parking pathway generating section
5: turnaround parking pathway generating section
6: guiding control section
7: position information calculating section
8: report outputting section
8a: image processing module
8b: sound/voice processing module
21: monitor
22: speaker
30: vehicle

The invention claimed is:

1. A parking assist apparatus comprising:
   a parking target position setting section for setting a parking target position when a vehicle is to be parked by reversing;
   a parking pathway determining section for determining possibility/impossibility of direct parking for parking the vehicle to the parking target position without turnaround;
   a report outputting section for effecting reporting to allow a driver engaged in parking to recognize the possibility/impossibility of the direct parking based on the result of determination by the parking pathway determining section; and
   a turnaround parking pathway generating section for generating a turnaround parking pathway for parking to the parking target position via turnaround traveling and turnaround parking pathway information when said parking pathway determining section has determined that direct parking is not possible;
   wherein said report outputting section reports said turnaround parking pathway information generated by said turnaround parking pathway generating section.

2. The parking assist apparatus according to claim 1, wherein said turnaround parking pathway generating section generates turnaround point information for specifying a turnaround point in the turnaround parking and said report outputting section reports a turnaround point based on said turnaround point information.

3. The parking assist apparatus according to claim 1, wherein said report outputting section effects said reporting for making the driver recognize the possibility/impossibility of the direct parking by image displaying on a monitor and/or outputting of a sound.

4. The parking assist apparatus according to claim 2, further comprising:
   a guiding control section for effecting either one or both of said direct parking and said turnaround parking by automatic steering of the vehicle.

5. The parking assist apparatus according to claim 2, wherein said direct parking and said turnaround parking are effected by a manual steering by the driver.

6. The parking assist apparatus according to claim 1, wherein said report outputting section issues a reversing sound when the direct parking is possible and issues an alarm sound different from said reversing sound when the direct parking is not possible.

7. The parking assist apparatus according to claim 1, wherein said parking target position setting section calculates said parking target position from vehicle periphery information detected during forwarding of the vehicle.

8. The parking assist apparatus according to claim 7, wherein said report outputting section is configured to report the possibility of direct parking to a driver currently engaged in forwarding, when said parking pathway determining section determines that the direct parking is possible.

9. The parking assist apparatus according to claim 7, wherein said parking target position setting section detects an estimated parking area based on photographic image obtained from at least one camera.

* * * * *